United States Patent
Levasseur et al.

(10) Patent No.: US 9,024,226 B2
(45) Date of Patent: May 5, 2015

(54) EDM METHOD FOR MULTI-LOBED COOLING HOLE

(75) Inventors: Glenn Levasseur, Colchester, CT (US);
Edward F. Pietraszkiewicz, Southington, CT (US); Mark F. Zelesky, Bolton, CT (US); Dominic J. Mongillo, Jr., West Hartford, CT (US); Kevin J. Klinefelter, Uncasville, CT (US); Stephen D. Doll, Portland, CT (US); Markus W. Fritch, Manchester, CT (US)

(73) Assignee: United Technologies Corporation, Hartford, CT (US)

( * ) Notice: Subject to any disclaimer, the term of this patent is extended or adjusted under 35 U.S.C. 154(b) by 374 days.

(21) Appl. No.: 13/544,031

(22) Filed: Jul. 9, 2012

(65) Prior Publication Data

US 2013/0206733 A1    Aug. 15, 2013

Related U.S. Application Data

(60) Provisional application No. 61/599,366, filed on Feb. 15, 2012, provisional application No. 61/599,372, filed on Feb. 15, 2012, provisional application No. 61/599,381, filed on Feb. 15, 2012.

(51) Int. Cl.
*B23H 9/10* (2006.01)
*B23H 1/00* (2006.01)
*B23H 7/26* (2006.01)

(52) U.S. Cl.
CPC .. *B23H 9/10* (2013.01); *B23H 1/00* (2013.01); *B23H 7/26* (2013.01)

(58) Field of Classification Search
CPC .............. B23H 9/10; B23H 9/14; B23H 1/00; B23H 7/26
See application file for complete search history.

(56) References Cited

U.S. PATENT DOCUMENTS

| | | | |
|---|---|---|---|
| 4,197,443 | A | 4/1980 | Sidenstick |
| 4,529,358 | A | 7/1985 | Papell |
| 4,622,821 | A | 11/1986 | Madden |
| 4,653,279 | A | 3/1987 | Reynolds |
| 4,653,983 | A | 3/1987 | Vehr |
| 4,672,727 | A | 6/1987 | Field |

(Continued)

FOREIGN PATENT DOCUMENTS

| | | |
|---|---|---|
| EP | 1326007 A2 | 7/2003 |
| EP | 1609949 A1 | 12/2005 |

OTHER PUBLICATIONS

International Search Report and Written Opinion, dated Nov. 5, 2013, for PCT Application No. PCT/US2013/025716, 13 pages.

(Continued)

*Primary Examiner* — Geoffrey S Evans
(74) *Attorney, Agent, or Firm* — Kinney & Lange, P.A.

(57) ABSTRACT

A method for forming a cooling hole extending from an inlet on a first surface of a wall to an outlet on a second surface of the wall includes forming a diffusing section of the cooling hole, and a trailing edge on the outlet by electrical discharge machining, and forming longitudinal lobes in the diffusing section. The metering section extends from the inlet on a first surface of the wall towards the second surface of the wall. The diffusing section extends from the outlet to one end of a metering section located between the inlet and the outlet. The outlet is substantially linear or convex at the trailing edge and the lobes are separated by longitudinal ridges.

22 Claims, 8 Drawing Sheets

(56) References Cited

U.S. PATENT DOCUMENTS

| | | | |
|---|---|---|---|
| 4,684,323 A | 8/1987 | Field | |
| 4,700,544 A | 10/1987 | Fucci | |
| 4,738,588 A | 4/1988 | Field | |
| 4,762,464 A * | 8/1988 | Vertz et al. | 416/97 R |
| 5,062,768 A | 11/1991 | Marriage | |
| 5,096,379 A | 3/1992 | Stroud et al. | |
| 5,129,231 A | 7/1992 | Becker et al. | |
| 5,252,026 A | 10/1993 | Shepherd | |
| 5,326,224 A | 7/1994 | Lee et al. | |
| 5,358,374 A | 10/1994 | Correia et al. | |
| 5,382,133 A | 1/1995 | Moore et al. | |
| 5,418,345 A | 5/1995 | Adamski | |
| 5,419,681 A | 5/1995 | Lee | |
| 5,605,639 A * | 2/1997 | Banks et al. | 219/69.17 |
| 5,609,779 A | 3/1997 | Crow et al. | |
| 5,651,662 A | 7/1997 | Lee et al. | |
| 5,660,525 A | 8/1997 | Lee et al. | |
| 5,683,600 A | 11/1997 | Kelley et al. | |
| 5,813,836 A | 9/1998 | Starkweather | |
| 6,139,258 A | 10/2000 | Lang, III et al. | |
| 6,183,199 B1 | 2/2001 | Beeck et al. | |
| 6,241,468 B1 | 6/2001 | Lock et al. | |
| 6,243,948 B1 | 6/2001 | Lee et al. | |
| 6,287,075 B1 | 9/2001 | Kercher | |
| 6,307,175 B1 | 10/2001 | Blochlinger et al. | |
| 6,494,678 B1 | 12/2002 | Bunker | |
| 6,547,524 B2 | 4/2003 | Kohli et al. | |
| 6,572,335 B2 | 6/2003 | Kuwabara et al. | |
| 6,630,645 B2 * | 10/2003 | Richter et al. | 219/121.71 |
| 6,744,010 B1 | 6/2004 | Pepe et al. | |
| 6,944,580 B1 | 9/2005 | Blume et al. | |
| 6,973,419 B1 | 12/2005 | Fortin et al. | |
| 6,979,176 B2 | 12/2005 | Nakamata et al. | |
| 7,186,085 B2 | 3/2007 | Lee | |
| 7,273,351 B2 | 9/2007 | Kopmels | |
| 7,328,580 B2 | 2/2008 | Lee et al. | |
| 7,374,401 B2 | 5/2008 | Lee | |
| 7,578,653 B2 | 8/2009 | Klasing et al. | |
| 7,726,131 B2 | 6/2010 | Sze et al. | |
| 7,766,609 B1 | 8/2010 | Liang | |
| 7,887,294 B1 | 2/2011 | Liang | |
| 7,997,868 B1 * | 8/2011 | Liang | 416/97 R |
| 8,038,399 B1 | 10/2011 | Liang | |
| 8,043,057 B1 * | 10/2011 | Liang | 416/97 R |
| 8,057,181 B1 | 11/2011 | Liang | |
| 8,683,813 B2 * | 4/2014 | Xu et al. | 60/806 |
| 8,733,111 B2 * | 5/2014 | Gleiner et al. | 60/806 |
| 2001/0036401 A1 | 11/2001 | Harvey et al. | |
| 2002/0159888 A1 | 10/2002 | Rinck et al. | |
| 2004/0170499 A1 * | 9/2004 | Powis et al. | 416/97 R |
| 2005/0106020 A1 | 5/2005 | Bunker et al. | |
| 2005/0286998 A1 * | 12/2005 | Lee et al. | 415/117 |
| 2006/0138092 A1 * | 6/2006 | Chen et al. | 219/69.13 |
| 2006/0153681 A1 * | 7/2006 | Lee et al. | 416/97 R |
| 2006/0163211 A1 * | 7/2006 | Pietraszkiewicz et al. | 219/69.17 |
| 2008/0003096 A1 | 1/2008 | Kohli et al. | |
| 2008/0145208 A1 | 6/2008 | Klasing et al. | |
| 2009/0013695 A1 | 1/2009 | Dierberger et al. | |
| 2009/0304499 A1 | 12/2009 | Strock et al. | |
| 2010/0068032 A1 | 3/2010 | Liang | |
| 2010/0068068 A1 | 3/2010 | Liang | |
| 2010/0282721 A1 | 11/2010 | Bunker et al. | |
| 2011/0097191 A1 | 4/2011 | Bunker | |
| 2011/0185572 A1 | 8/2011 | Wei et al. | |
| 2011/0293423 A1 * | 12/2011 | Bunker et al. | 416/95 |
| 2012/0051941 A1 | 3/2012 | Bunker | |
| 2012/0167389 A1 | 7/2012 | Lacy et al. | |

OTHER PUBLICATIONS

Kusterer, K. et al. "The Nekomimi Cooling Technology: Cooling Holes with Ears for High-Efficient Film Cooling" Proceedings of ASME Turbo Expo 2011, Jun. 6-10, 2011. 11 pages.

* cited by examiner

EDM METHOD FOR MULTI-LOBED COOLING HOLE

CROSS-REFERENCE TO RELATED APPLICATION

This application claims priority to U.S. Provisional Application No. 61/599,366, filed on Feb. 15, 2012 and entitled "EDM METHOD FOR MULTI-LOBED COOLING HOLE", U.S. Provisional Application No. 61/599,372, filed on Feb. 15, 2012 and entitled "MULTI-LOBED COOLING HOLE AND METHOD OF MANUFACTURE" and U.S. Provisional Application No. 61/599,381, filed on Feb. 15, 2012 and entitled "TRI-LOBED COOLING HOLE AND METHOD OF MANUFACTURE", the disclosures of which are incorporated by reference in their entirety.

BACKGROUND

This invention relates generally to turbomachinery, and specifically to electro-discharge machining (EDM) methods for gas turbine engine components. In particular, the invention relates to EDM methods for machining cooling holes in turbomachinery components exposed to hot working fluid flow, including, but not limited to, rotor blades and stator vane airfoils, endwall surfaces including platforms, shrouds and compressor and turbine casings, combustor liners, turbine exhaust assemblies, thrust augmentors and exhaust nozzles.

Gas turbine engines are rotary-type combustion turbine engines built around a power core made up of a compressor, combustor and turbine, arranged in flow series with an upstream inlet and downstream exhaust. The compressor section compresses air from the inlet, which is mixed with fuel in the combustor and ignited to generate hot combustion gas. The turbine section extracts energy from the expanding combustion gas, and drives the compressor section via a common shaft. Expanded combustion products are exhausted downstream, and energy is delivered in the form of rotational energy in the shaft, reactive thrust from the exhaust, or both.

Gas turbine engines provide efficient, reliable power for a wide range of applications in aviation, transportation and industrial power generation. Small-scale gas turbine engines typically utilize a one-spool design, with co-rotating compressor and turbine sections. Larger-scale combustion turbines including jet engines and industrial gas turbines (IGTs) are generally arranged into a number of coaxially nested spools. The spools operate at different pressures, temperatures and spool speeds, and may rotate in different directions.

Individual compressor and turbine sections in each spool may also be subdivided into a number of stages, formed of alternating rows of rotor blade and stator vane airfoils. The airfoils are shaped to turn, accelerate and compress the working fluid flow, or to generate lift for conversion to rotational energy in the turbine.

Industrial gas turbines often utilize complex nested spool configurations, and deliver power via an output shaft coupled to an electrical generator or other load, typically using an external gearbox. In combined cycle gas turbines (CCGTs), a steam turbine or other secondary system is used to extract additional energy from the exhaust, improving thermodynamic efficiency. Gas turbine engines are also used in marine and land-based applications, including naval vessels, trains and armored vehicles, and in smaller-scale applications such as auxiliary power units.

Aviation applications include turbojet, turbofan, turboprop and turboshaft engine designs. In turbojet engines, thrust is generated primarily from the exhaust. Modern fixed-wing aircraft generally employ turbofan and turboprop configurations, in which the low pressure spool is coupled to a propulsion fan or propeller. Turboshaft engines are employed on rotary-wing aircraft, including helicopters, typically using a reduction gearbox to control blade speed. Unducted (open rotor) turbofans and ducted propeller engines also known, in a variety of single-rotor and contra-rotating designs with both forward and aft mounting configurations.

Aviation turbines generally utilize two and three-spool configurations, with a corresponding number of coaxially rotating turbine and compressor sections. In two-spool designs, the high pressure turbine drives a high pressure compressor, forming the high pressure spool or high spool. The low-pressure turbine drives the low spool and fan section, or a shaft for a rotor or propeller. In three-spool engines, there is also an intermediate pressure spool. Aviation turbines are also used to power auxiliary devices including electrical generators, hydraulic pumps and elements of the environmental control system, for example using bleed air from the compressor or via an accessory gearbox.

Additional turbine engine applications and turbine engine types include intercooled, regenerated or recuperated and variable cycle gas turbine engines, and combinations thereof. In particular, these applications include intercooled turbine engines, for example with a relatively higher pressure ratio, regenerated or recuperated gas turbine engines, for example with a relatively lower pressure ratio or for smaller-scale applications, and variable cycle gas turbine engines, for example for operation under a range of flight conditions including subsonic, transonic and supersonic speeds. Combined intercooled and regenerated/recuperated engines are also known, in a variety of spool configurations with traditional and variable cycle modes of operation.

Turbofan engines are commonly divided into high and low bypass configurations. High bypass turbofans generate thrust primarily from the fan, which accelerates airflow through a bypass duct oriented around the engine core. This design is common on commercial aircraft and transports, where noise and fuel efficiency are primary concerns. The fan rotor may also operate as a first stage compressor, or as a pre-compressor stage for the low-pressure compressor or booster module. Variable-area nozzle surfaces can also be deployed to regulate the bypass pressure and improve fan performance, for example during takeoff and landing. Advanced turbofan engines may also utilize a geared fan drive mechanism to provide greater speed control, reducing noise and increasing engine efficiency, or to increase or decrease specific thrust.

Low bypass turbofans produce proportionally more thrust from the exhaust flow, generating greater specific thrust for use in high-performance applications including supersonic jet aircraft. Low bypass turbofan engines may also include variable-area exhaust nozzles and afterburner or augmentor assemblies for flow regulation and short-term thrust enhancement. Specialized high-speed applications include continuously afterburning engines and hybrid turbojet/ramjet configurations.

Across these applications, turbine performance depends on the balance between higher pressure ratios and core gas path temperatures, which tend to increase efficiency, and the related effects on service life and reliability due to increased stress and wear. This balance is particularly relevant to gas turbine engine components in the hot sections of the compressor, combustor, turbine and exhaust sections, where active cooling is required to prevent damage due to high gas path temperatures and pressures. To achieve efficient active cooling, advanced machining methods are required.

SUMMARY

A method for forming a cooling hole extending from an inlet on a first surface of a wall to an outlet on a second surface of the wall includes forming a diffusing section of the cooling hole, and a trailing edge on the outlet by electrical discharge machining, and forming longitudinal lobes in the diffusing section. The metering section extends from the inlet on a first surface of the wall towards the second surface of the wall. The diffusing section extends from the outlet to one end of a metering section located between the inlet and the outlet. The outlet is substantially linear or convex at the trailing edge and the lobes are separated by longitudinal ridges.

A method for forming a cooling hole in a wall of a gas turbine engine component includes machining a metering section in the wall by moving a discharge electrode along an axis for a first machining distance, machining lobes along the cooling hole by moving a discharge electrode longitudinally along the wall for a set of second machining distances and machining a trailing edge onto the lobes by moving a discharge electrode transversely along the wall by a third machining distance. The first machining distance is determined by compensating a shape of the metering section for electrode wear. The second machining distances are determined by compensating shapes of each lobe for electrode wear. The third machining distance is determined by compensating a width of the trailing edge for electrode wear.

DETAILED DESCRIPTION

Figure 1:
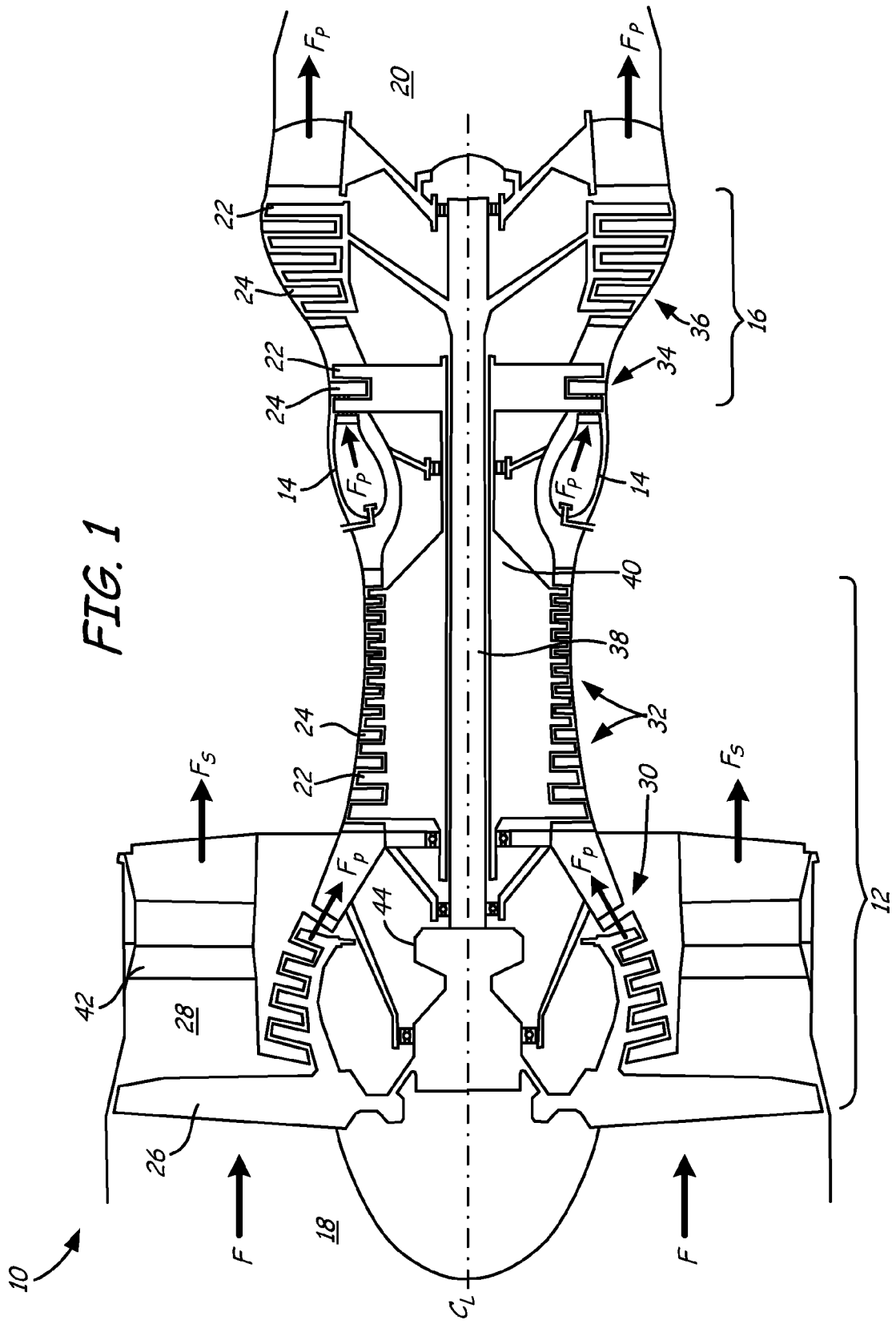
FIG. 1 is a cross-sectional view of a gas turbine engine.

FIG. 1 is a cross-sectional view of gas turbine engine 10. Gas turbine engine (or turbine engine) 10 includes a power core with compressor section 12, combustor 14 and turbine section 16 arranged in flow series between upstream inlet 18 and downstream exhaust 20. Compressor section 12 and turbine section 16 are arranged into a number of alternating stages of rotor airfoils (or blades) 22 and stator airfoils (or vanes) 24.

In the turbofan configuration of FIG. 1, propulsion fan 26 is positioned in bypass duct 28, which is coaxially oriented about the engine core along centerline (or turbine axis) $C_L$. An open-rotor propulsion stage 26 may also provided, with turbine engine 10 operating as a turboprop or unducted turbofan engine. Alternatively, fan rotor 26 and bypass duct 28 may be absent, with turbine engine 10 configured as a turbojet or turboshaft engine, or an industrial gas turbine.

For improved service life and reliability, components of gas turbine engine 10 are provided with an improved cooling configuration, as described below. Suitable components for the cooling configuration include rotor airfoils 22, stator airfoils 24 and other gas turbine engine components exposed to hot gas flow, including, but not limited to, platforms, shrouds, casings and other endwall surfaces in hot sections of compressor 12 and turbine 16, and liners, nozzles, afterburners, augmentors and other gas wall components in combustor 14 and exhaust section 20.

In the two-spool, high bypass configuration of FIG. 1, compressor section 12 includes low pressure compressor (LPC) 30 and high pressure compressor (HPC) 32, and turbine section 16 includes high pressure turbine (HPT) 34 and low pressure turbine (LPT) 36. Low pressure compressor 30 is rotationally coupled to low pressure turbine 36 via low pressure (LP) shaft 38, forming the LP spool or low spool. High pressure compressor 32 is rotationally coupled to high pressure turbine 34 via high pressure (HP) shaft 40, forming the HP spool or high spool.

Flow F at inlet 18 divides into primary (core) flow $F_P$ and secondary (bypass) flow $F_S$ downstream of fan rotor 26. Fan rotor 26 accelerates secondary flow $F_S$ through bypass duct 28, with fan exit guide vanes (FEGVs) 42 to reduce swirl and improve thrust performance. In some designs, structural guide vanes (SGVs) 42 are used, providing combined flow turning and load bearing capabilities.

Primary flow $F_P$ is compressed in low pressure compressor 30 and high pressure compressor 32, then mixed with fuel in combustor 14 and ignited to generate hot combustion gas. The combustion gas expands to provide rotational energy in high pressure turbine 34 and low pressure turbine 36, driving high pressure compressor 32 and low pressure compressor 30, respectively. Expanded combustion gases exit through exhaust section (or exhaust nozzle) 20, which can be shaped or actuated to regulate the exhaust flow and improve thrust performance.

Low pressure shaft 38 and high pressure shaft 40 are mounted coaxially about centerline $C_L$, and rotate at different speeds. Fan rotor (or other propulsion stage) 26 is rotationally coupled to low pressure shaft 38. In advanced designs, fan drive gear system 44 is provided for additional fan speed control, improving thrust performance and efficiency with reduced noise output.

Fan rotor 26 may also function as a first-stage compressor for gas turbine engine 10, and LPC 30 may be configured as an intermediate compressor or booster. Alternatively, propulsion stage 26 has an open rotor design, or is absent, as described above. Gas turbine engine 10 thus encompasses a wide range of different shaft, spool and turbine engine configurations, including one, two and three-spool turboprop and (high or low bypass) turbofan engines, turboshaft engines, turbojet engines, and multi-spool industrial gas turbines.

In each of these applications, turbine efficiency and performance depend on the overall pressure ratio, defined by the total pressure at inlet 18 as compared to the exit pressure of compressor section 12, for example at the outlet of high pressure compressor 32, entering combustor 14. Higher pressure ratios, however, also result in greater gas path temperatures, increasing the cooling loads on rotor airfoils 22, stator airfoils 24 and other components of gas turbine engine 10. To reduce operating temperatures, increase service life and maintain engine efficiency, these components are provided with improved cooling configurations, as described below. Suitable components include, but are not limited to, cooled gas turbine engine components in compressor sections 30 and 32, combustor 14, turbine sections 34 and 36, and exhaust section 20 of gas turbine engine 10.

Figure 2A:
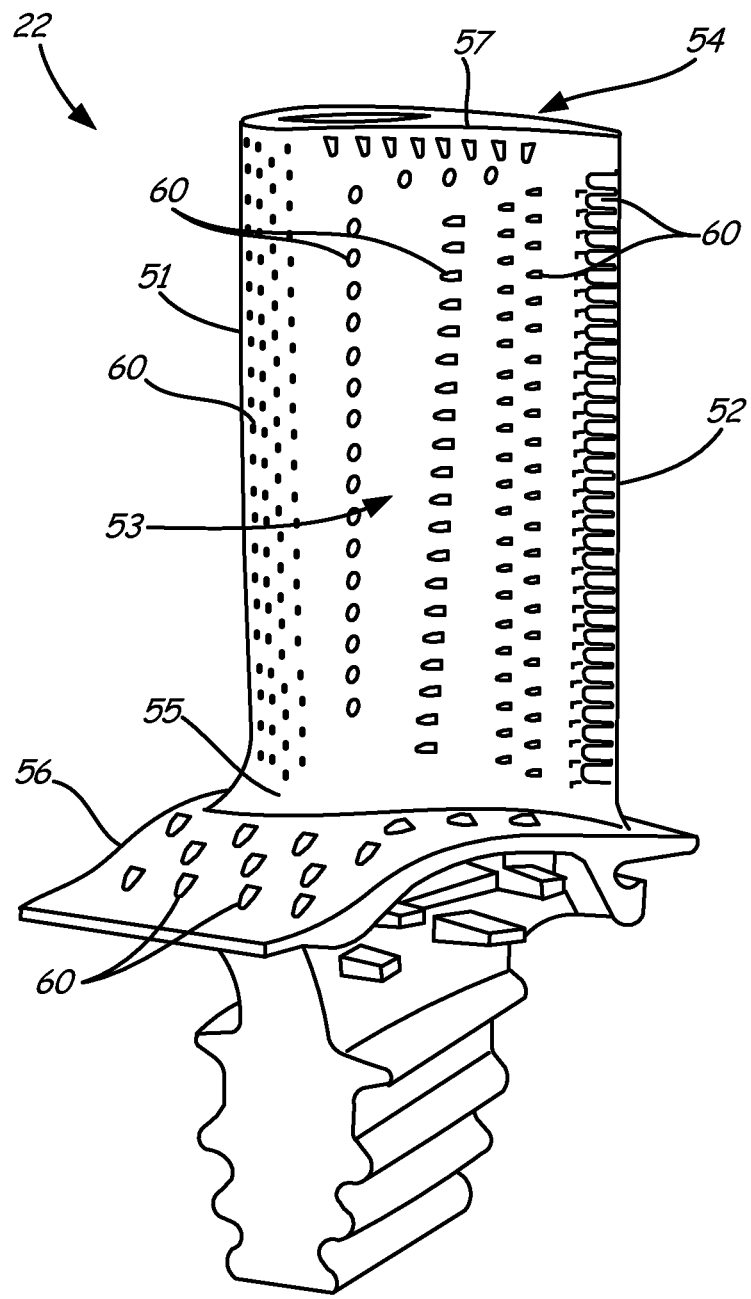
FIG. 2A is a perspective view of an airfoil for the gas turbine engine, in a rotor blade configuration.

FIG. 2A is a perspective view of rotor airfoil (or blade) 22 for gas turbine engine 10, as shown in FIG. 1, or for another turbomachine. Rotor airfoil 22 extends axially from leading edge 51 to trailing edge 52, defining pressure surface 53 (front) and suction surface 54 (back) therebetween.

Pressure and suction surfaces 53 and 54 form the major opposing surfaces or walls of airfoil 22, extending axially between leading edge 51 and trailing edge 52, and radially from root section 55, adjacent inner diameter (ID) platform 56, to tip section 57, opposite ID platform 56. In some designs, tip section 57 is shrouded.

Cooling holes or outlets 60 are provided on one or more surfaces of airfoil 22, for example along leading edge 51, trailing edge 52, pressure (or concave) surface 53, or suction (or convex) surface 54, or a combination thereof. Cooling holes or passages 60 may also be provided on the endwall surfaces of airfoil 22, for example along ID platform 56, or on a shroud or engine casing adjacent tip section 57.

Figure 2B:
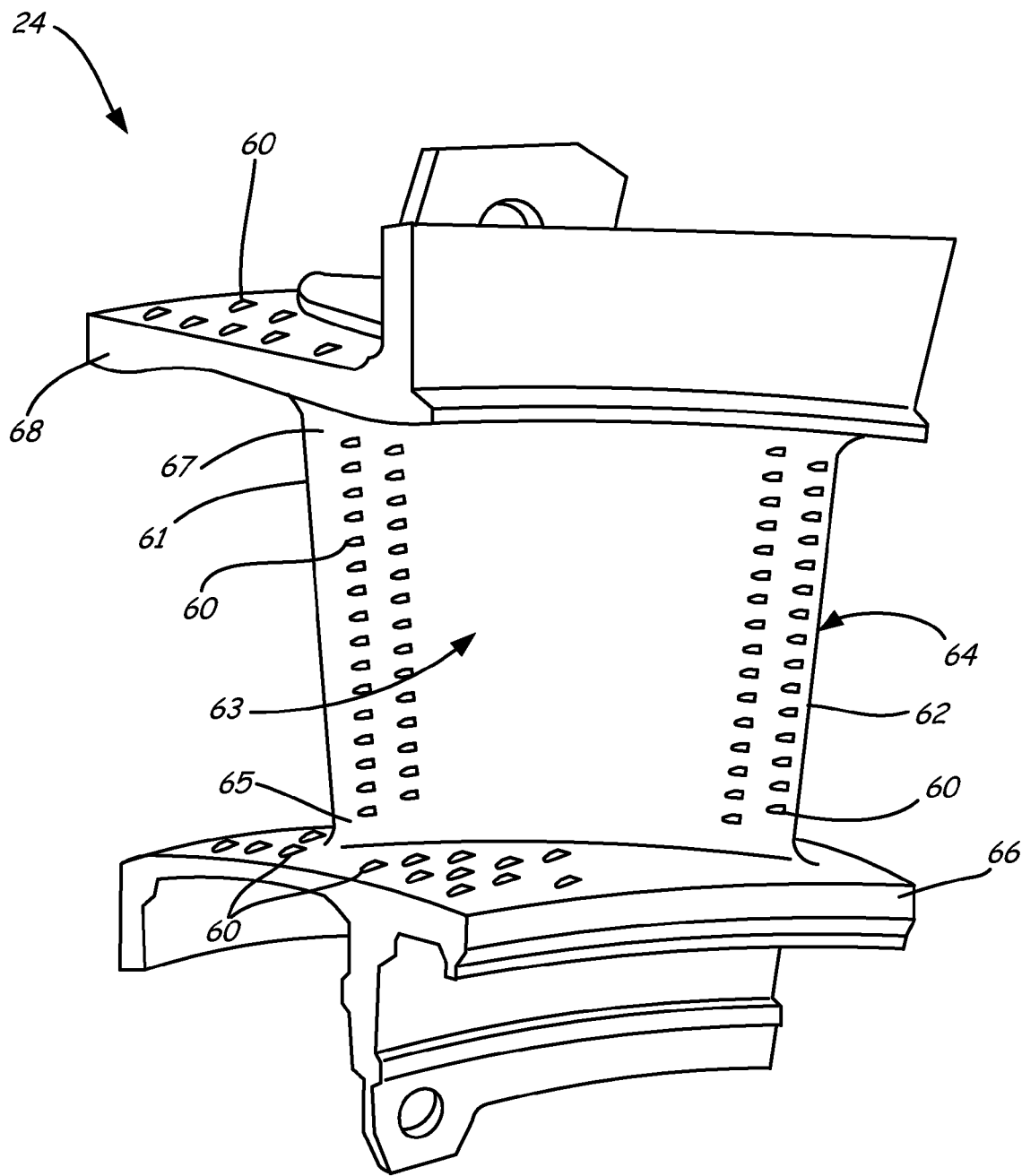
FIG. 2B is a perspective view of an airfoil for the gas turbine engine, in a stator vane configuration.

FIG. 2B is a perspective view of stator airfoil (or vane) 24 for gas turbine engine 10, as shown in FIG. 1, or for another turbomachine. Stator airfoil 24 extends axially from leading edge 61 to trailing edge 62, defining pressure surface 63 (front) and suction surface 64 (back) therebetween. Pressure and suction surfaces 63 and 64 extend from inner (or root) section 65, adjacent ID platform 66, to outer (or tip) section 67, adjacent outer diameter (OD) platform 68.

Cooling holes or outlets 60 are provided along one or more surfaces of airfoil 24, for example leading or trailing edge 61 or 62, pressure (concave) or suction (convex) surface 63 or 64, or a combination thereof. Cooling holes or passages 60 may also be provided on the endwall surfaces of airfoil 24, for example along ID platform 66 and OD platform 68.

Rotor airfoils 22 (FIG. 2A) and stator airfoils 24 (FIG. 2B) are formed of high strength, heat resistant materials such as high temperature alloys and superalloys, and are provided with thermal and erosion-resistant coatings. Airfoils 22 and 24 are also provided with internal cooling passages and cooling holes 60 to reduce thermal fatigue and wear, and to prevent melting when exposed to hot gas flow in the higher temperature regions of a gas turbine engine or other turbomachine. Cooling holes 60 deliver cooling fluid (e.g., steam or air from a compressor) through the outer walls and platform structures of airfoils 22 and 24, creating a thin layer (or film) of cooling fluid to protect the gas path surfaces from high temperature flow.

While surface cooling extends service life and increases reliability, injecting cooling fluid into the gas path also reduces engine efficiency, and the cost in efficiency increases with the required cooling flow. Cooling holes 60 are thus provided with improved metering and inlet geometry to reduce jets and blow off, and improved diffusion and exit geometry to reduce flow separation and corner effects. Cooling holes 60 reduce flow requirements and improve the spread of cooling fluid across the hot surfaces of airfoils 22 and 24, and other gas turbine engine components, so that less flow is needed for cooling and efficiency is maintained or increased.

Figure 2C:
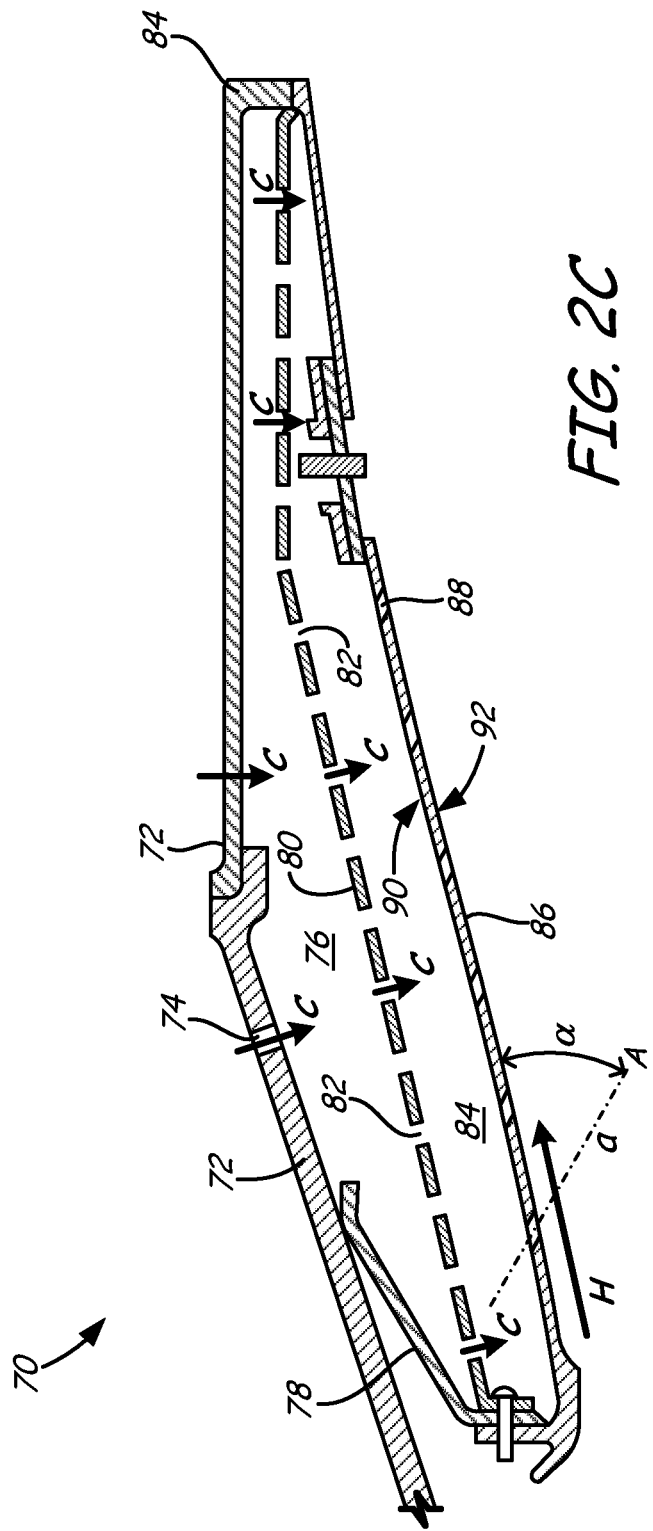
FIG. 2C is a cross-sectional view of an impingement film and film cooling assembly for the gas turbine engine.

FIG. 2C is a cross-sectional view of impingement film and film cooling (float wall) assembly 70. Assembly 70 includes outer case 72 with cooling fluid apertures 74 for directing cooling fluid flow C into cooling fluid plenum 76, with seal 78 and float wall (splash plate or impingement baffle) 80 having impingement holes 82 for impingement cooling of turbine component 84 along gas flow path wall 86.

As shown in FIG. 2C, gas path wall (or liner wall) 86 extends along impingement baffle 80, across impingement plenum 84. First (outer) major surface 90 of gas path wall 86 is exposed to impingement flow of cooling fluid C from cooling fluid plenum 76, through impingement holes 82 in impingement baffle 80. Second (inner) major surface 108 extends opposite first major surface 90, and is exposed to hot gas flow H, for example combustion gas or exhaust gas. Cooling holes 88 extend from impingement plenum 84 at first surface 90 through gas path wall 86 to second surface 92.

Cooling fluid C is supplied to cooling plenum 76 via cooling holes 74 in an outer turbine case or other plenum boundary 72. Cooling fluid C from cooling plenum 76 is supplied to impingement plenum 84 via impingement holes 82 in float wall (or impingement baffle) 80, where impingement holes 82 are sized to produce jets of cooling fluid flow C impinging onto first surface 90 of gas path wall 86.

Cooling holes 88 extend through gas path wall 86 from first (relatively cool) surface 90 to second (relatively hot) surface 92. Axis A is inclined in a downstream sense at angle α with respect to the direction of hot gas flow H, in order to encourage attached flow along hot inner surface 92 of gas path wall 86. In some embodiments, cooling holes 104 also have a circumferential component, in order to encourage tangential film flow.

The example of FIG. 2C is merely representative, and varies from application to application. For example, cooling assembly 70 may be configured for use with a turbine exhaust assembly or similar gas turbine engine component 84 in low pressure turbine 36 or exhaust section 20 of gas turbine engine 10, as shown in FIG. 1, or with a combustor liner assembly or similar gas turbine engine component 84 for combustor 14. Alternatively, cooling assembly 70 may be configured for use with a cooled turbine liner or casing component 84 in high pressure turbine 34 or low pressure turbine 36, a hot section compressor liner or casing component 84 for high pressure compressor 32, or an exhaust nozzle liner or augmentor component 100 for exhaust section 20.

In airfoil applications, cooling assembly 70 is configured for use with rotor airfoil 22, stator airfoil 24 or other airfoil component 84, with cooling hole 88 forming cooling hole 60 in a pressure surface, suction surface or platform surface, as shown in FIGS. 2A and 2B. Impingement baffle 80 extends within airfoil component 84, adjacent first surface 90 of flow path wall 86, where first surface 90 is an inner surface of the airfoil, and second (outer) surface 92 is exposed to hot working fluid flow.

The components of cooling assembly 70 are typically manufactured from durable heat-resistant materials such as high-temperature metal alloys or superalloys, in order to protect from hot gas (or working fluid) flow H. In addition, thermal barrier coatings and other protective coatings may be used, as described above for airfoils 22 and 24. To further improve service life and reliability, cooling holes 88 are configured with improved metering and diffusive flow geometries, as described below.

Figure 3:
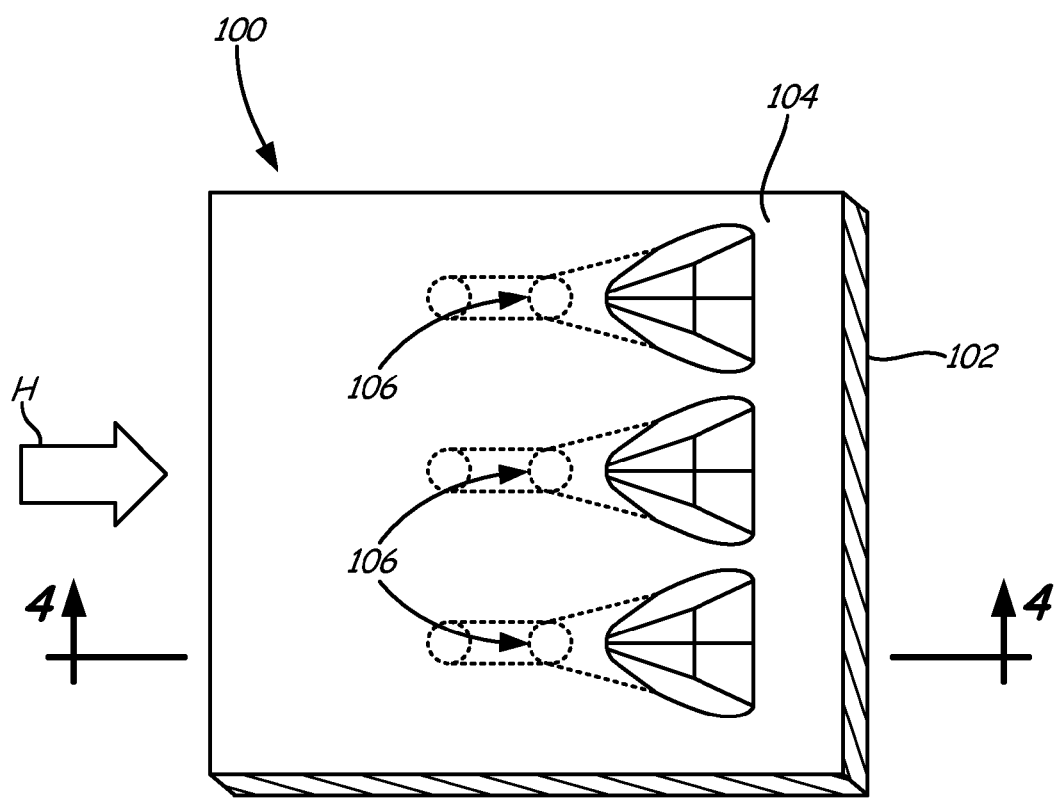
FIG. 3 is a view of a wall having multi-lobed cooling holes.

FIG. 3 illustrates a view of a wall of a gas turbine engine component having an array of multi-lobed film cooling holes. Wall 100 includes first wall surface 102 and second wall surface 104. As described in greater detail below, wall 100 is primarily metallic and second wall surface 104 can include a thermal barrier coating. Multi-lobed film cooling holes 106 are oriented so that their inlets are positioned on the first wall surface 102 and their outlets are positioned on second wall surface 104. During gas turbine engine operation, second wall surface 104 is in proximity to high temperature gases (e.g., combustion gases, hot air). Cooling air is delivered inside wall 100 where it exits the interior of the component through cooling holes 106 and forms a cooling film on second wall surface 104. As shown in FIG. 3, cooling holes 106 have two lobes in the diffusing section of the cooling hole outlet on second wall surface 104. Multiple multi-lobed film cooling holes 106 are positioned side-by-side in a row to form cooling hole array 107.

As described below in greater detail, cooling air flows out of cooling holes 106, with cooling air flowing through each of the lobes in the diffusing section. Cooling holes 106 of cooling hole array 107 can be arranged in a row on wall 100 as shown in FIG. 3 and positioned axially so that the cooling air flows in substantially the same direction longitudinally as the high temperature gases flowing past wall 100. In this embodiment, cooling air passing through cooling holes 106 exits cooling holes traveling in substantially the same direction as the high temperature gases flowing along second wall surface 104 (represented by arrow H). Here, the linear row of cooling holes 106 is substantially perpendicular to the direction of flow H to create array 107. In alternate embodiments, the orientation of cooling holes 106 can be arranged on second wall surface 104 so that the flow of cooling air is substantially perpendicular to the hot air flow (i.e. cooling air exits cooling holes 106 radially) or at an angle between parallel and perpendicular. Cooling holes 106 can be located on a variety of components that require cooling. Suitable components include, but are not limited to, turbine vanes and blades, combustors, blade outer air seals, and augmentors, etc. Cooling holes 106 can be located on the pressure side or suction side of vanes and blades. Cooling holes 106 can also be located on the blade tip or blade or vane platforms.

Figure 4:
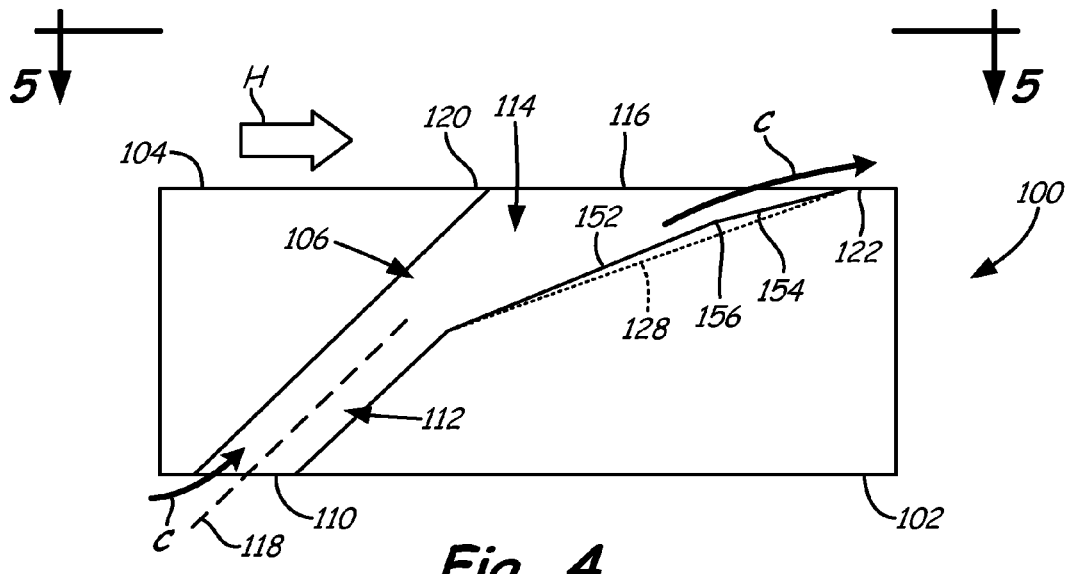
FIG. 4 is a sectional view of one of the multi-lobed cooling holes of FIG. 3 taken along the line 4-4.
Figure 5:
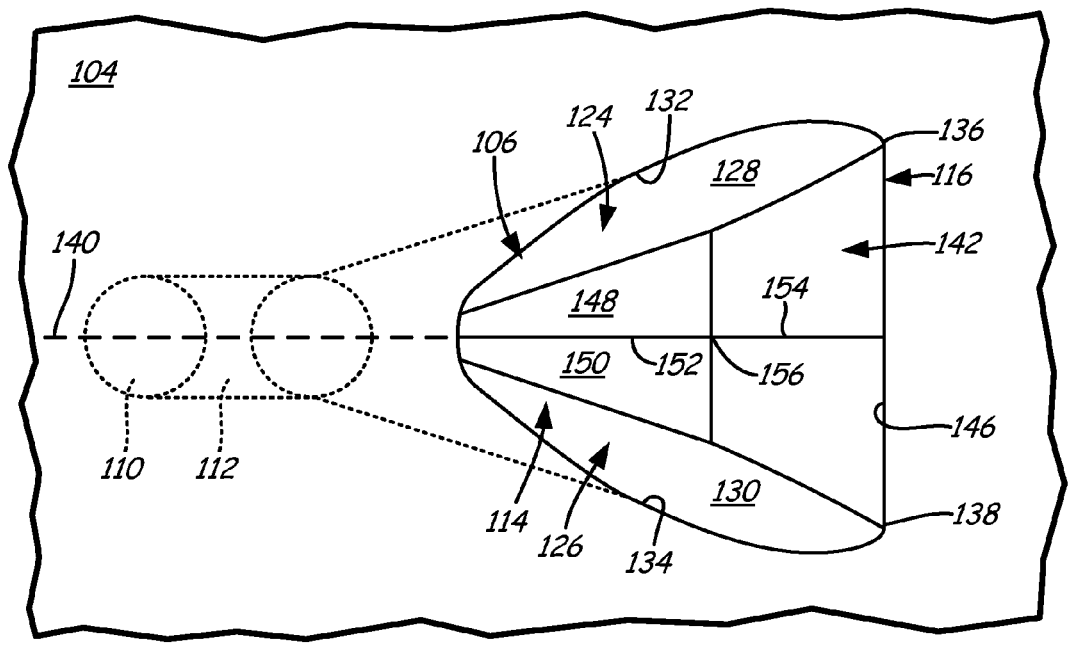
FIG. 5 is a view of the multi-lobed cooling hole of FIG. 4 taken along the line 5-5.

FIGS. 4 and 5 illustrate one embodiment of cooling hole 106 in greater detail. FIG. 4 illustrates a sectional view of multi-lobed film cooling hole 106 of FIG. 3 taken along the line 4-4. FIG. 5 illustrates a view of cooling hole 106 of FIG. 4 taken along the line 5-5. Cooling hole 106 includes inlet 110, metering section 112, diffusing section 114 and outlet 116. Inlet 110 is an opening located on first wall surface 102. Cooling air C enters cooling hole 106 through inlet 110 and passes through metering section 112 and diffusing section 114 before exiting cooling hole 106 at outlet 116 along second wall surface 104.

Metering section 112 is adjacent to and downstream from inlet 110 and controls (meters) the flow of cooling air through cooling hole 106. In exemplary embodiments, metering section 112 has a substantially constant flow area from inlet 110 to diffusing section 114. Metering section 112 can have circular, oblong (oval or elliptical), racetrack (oval with two parallel sides having straight portions) crescent, cusp or dual-cusp shaped axial cross sections. In FIGS. 4 and 5, metering section 112 has a circular cross section. Circular metering sections 112 have a length l and diameter d. In exemplary embodiments, inlet 110 and metering section 112 have the same diameter d. In some embodiments, circular metering section 112 has a length l according to the relationship: $d \leq l \leq 3d$. That is, the length of metering section 112 is between one and three times its diameter. The length of metering section 112 can exceed 3d, reaching upwards of $30d$. In alternate embodiments, metering section 112 has an oblong or racetrack-shaped or other shaped cross section. As oblong and racetrack configurations are not circular, their metering sections 112 have a length l and hydraulic diameter $d_h$. In some embodiments, metering section 112 has a length l according to the relationship: $d_h \leq l \leq 3d_h$. That is, the length of metering section 112 is between one and three times its hydraulic diameter. Again, the length of metering section 112 can exceed $3d_h$, reaching upwards of $30d_h$. In exemplary embodiments, metering section 112 is inclined with respect to wall 100 as illustrated in FIG. 4 (i.e. metering section 112 is not perpendicular to wall 100). Metering section 112 has a longitudinal axis represented by numeral 118.

Diffusing section 114 is adjacent to and downstream from metering section 112. Cooling air C diffuses within diffusing section 114 before exiting cooling hole 106 along second wall surface 104. Second wall surface 104 includes upstream end 120 (upstream of cooling hole 106) and downstream end 122 (downstream from cooling hole 106). Diffusing section 114 opens along second wall surface 104 between upstream end 120 and downstream end 122. As shown in FIG. 4, cooling air C diffuses away from longitudinal axis 118 in diffusing section 114 as it flows towards outlet 116.

As shown best in FIG. 5, diffusing section 114 includes two channel-like lobes 124 and 126 as described in the U.S. Provisional Application No. 61/599,372, filed on Feb. 15, 2012 and entitled "MULTI-LOBED COOLING HOLE AND METHOD OF MANUFACTURE", which is incorporated by reference. Lobes 124 and 126 are surfaces of wall 100 which define the void of cooling hole 106 at diffusing section 114. Each lobe 124, 126 diverges longitudinally and laterally from metering section 112 and has a bottom surface (bottom surfaces 128 and 130, respectively), a side wall along the outer edge of diffusing section 114 (the side walls are represented by lines 132 and 134, respectively) and a trailing edge (trailing edges 136 and 138, respectively). FIG. 4 best illustrates the longitudinal divergence (from longitudinal axis 118), while FIG. 5 best illustrates the lateral divergence (from centerline axis 140). As shown in FIG. 5, first lobe 124 laterally diverges upwards from centerline axis 140 and second lobe 126 laterally diverges downwards from centerline axis 140. Cooling air C leaving metering section 112 and entering diffusing section 114 diffuses into lobes 124 and 126, causing the cooling air to spread laterally within diffusing section 114. Side wall 132 and bottom surface 128 direct cooling air C through first lobe 124, and side wall 134 and bottom surface 130 direct cooling air C through second lobe 126.

Diffusing section 114 also includes interlobe region 142. End 146 of interlobe region 142 is adjacent outlet 116 where the outlet meets second wall surface 104. The location of end 146 of interlobe region 142 relative to trailing edges 136 and 138 can also vary. In the embodiment shown in FIG. 5, end 146 meets trailing edges 136 and 138 of lobes 124 and 126, respectively at outlet 116. In this embodiment, trailing edges 136 and 138 and hence, first lobe 124 and second lobe 126, extend to outlet 116 at second wall surface 104. In other embodiments, end 146 of interlobe region 142 is spaced from trailing edges 136 and 138. In these embodiments, trailing edges 136 and 138 and hence, first lobe 124 and second lobe 126, do not extend to outlet 116 at second wall surface 104.

In the embodiment illustrated in FIG. 5, diffusing section 114 also includes first inclined portion 148 and second inclined portion 150. First inclined portion 148 is located adjacent to and extends from bottom surface 128 of first lobe 124. First inclined portion 148 extends from first lobe 124 towards centerline axis 140 and second lobe 126. Second inclined portion 150 is located adjacent to and extends from bottom surface 130 of second lobe 126. Second inclined portion 150 extends from second lobe 126 towards centerline axis 140 and first lobe 124. Depending on the location of cooling hole 106, first inclined portion 148 and second inclined portion 150 can have varying lateral and longitudinal lengths and extend from lobes 124 and 126 at various angles (inclinations). Like the side walls and bottom surfaces, first and second inclined portions 148 and 150 direct cooling air C through lobes 124 and 126 of diffusing section 114.

In some embodiments, first inclined portion 148 and second inclined portion 150 meet together to form a ridge as shown in FIG. 5. Ridge 152 is located between first lobe 124 and second lobe 126 at the intersection of first inclined portion 148 and second inclined portion 150. Ridge 152 aids in separating and directing the flow of cooling air C into first lobe 124 and second lobe 126. The location and angle of ridge 152 within diffusing section 114 can vary to direct cooling air C within diffusing section 114 to suit the location and desired flow profile of cooling hole 106.

Ridge 152 can extend longitudinally to varying degrees between metering section 112 and interlobe region 142. Ridge 152 can extend upstream all the way to metering section 112, beginning where metering section 112 and diffusing section 114 meet as shown in FIG. 4. Alternatively, ridge 152 can begin farther downstream (closer to outlet 116). Ridge 152 can extend downstream to interlobe region 142 as shown in FIG. 4. Alternatively, ridge 152 can converge with bottom surfaces 128 and 130 upstream of interlobe region 142. Corresponding changes to the longitudinal lengths of first inclined portion 148 and second inclined portion 150 must accompany any change in the longitudinal extension of ridge 152. As shown in FIG. 4, ridge 152 does not extend to outlet 116.

Interlobe region 142 can take various shapes and have different configurations depending on the location and desired flow profile of cooling hole 106. The bottom surface of interlobe region 142 can be flat or curved. A curved (longitudinally convex) bottom surface of interlobe region 142 can facilitate improved flow attachment due to the Coanda effect. Interlobe region 142 can have a compound trapezoidal shape as shown in FIG. 5. In some embodiments, ridge 154 separates interlobe region 142 into two sides having surfaces in two different planes. Ridge 154 converges with bottom surface 130 of second lobe 126 at outlet 116 at second wall surface 104 as shown in FIG. 4. The intersection of ridges 152 and 154 at the point where interlobe region 142 meets first inclined portion 148 and second inclined portion 150 forms apex 156. By forming apex 156 upstream of outlet 116, diffusing section 114 facilitates improved flow attachment.

In other embodiments, cooling hole 106 has diffusing section 114 with three channel-like lobes 124, 126 and 128 as described in the U.S. Provisional Application No. 61/599,381, filed on Feb. 15, 2012 and entitled "TRI-LOBED COOLING HOLE AND METHOD OF MANUFACTURE", which is incorporated by reference.

Figure 6:
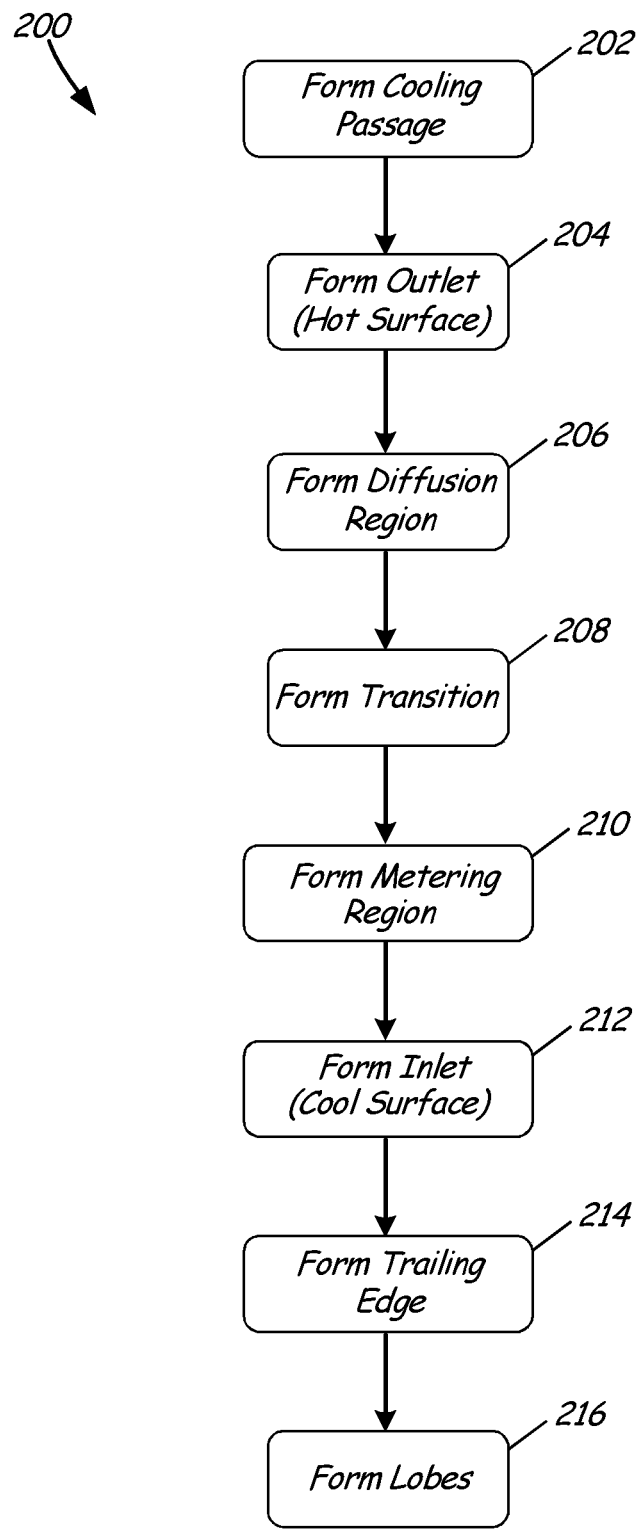
FIG. 6 is a block diagram of a method for forming a cooling hole in a gas turbine engine component.

FIG. 6 is a block diagram illustrating method 200 for forming a cooling hole in a gas turbine engine component. For example, method 200 may be used to form cooling holes 104 in rotor airfoil 22, stator airfoil 24 or other gas turbine engine component 100, as described above. Alternatively, method 200 may be used to form cooling holes 104 in a combustor liner, turbine exhaust assembly, augmentor assembly, exhaust nozzle or other gas turbine engine component 100 for cooling assembly 70, as shown in FIG. 2C.

Method 200 includes forming a cooling hole in a gas path wall (step 202), for example by forming an outlet in the surface of the gas path wall (step 204), forming a diffusion section (step 206) extending from the outlet to a metering section (step 208), and forming a metering section (step 210) extending from the diffusion section to an inlet (step 212). The outlet is typically formed in a hot surface of the gas path wall, where the component is exposed to combustion gas or other hot working fluid flow. The inlet is typically formed in a cool surface of the gas path wall, extending opposite the hot surface, where the component is exposed to cooling fluid flow.

Method 200 also includes forming a trailing edge on the outlet (step 214), where the outlet is substantially linear or convex at the trailing edge. Lobes are formed along the diffusion section (step 216), separated by longitudinal ridges. The diffusion section may also include a flat exit region, extending laterally along the width of the outlet at the trailing edge.

In one particular application, machining steps in method 200 are performed by an electrical discharge machining (EDM) process. In electric discharge machining, material is not removed by cutting, grinding or abrasion, as in traditional machine processes; instead, a current discharge is used to melt or vaporize the workpiece material.

Figure 7:
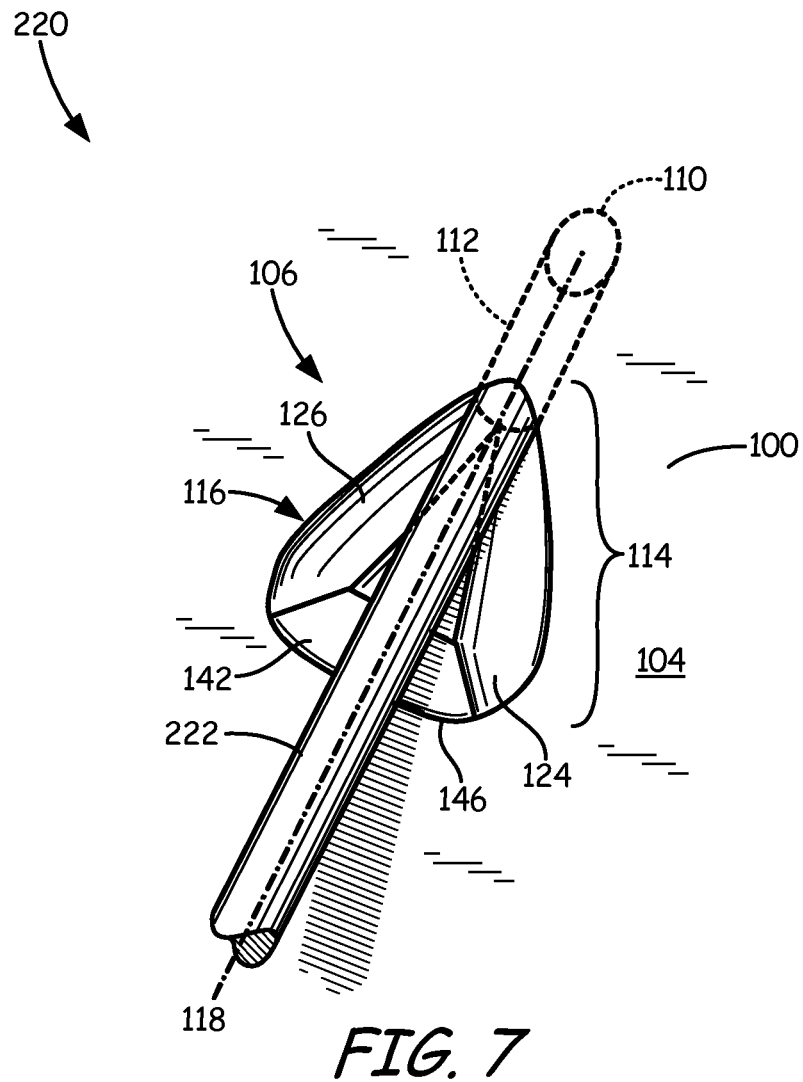
FIG. 7 is a schematic illustration of an electric discharge machining (EDM) apparatus.

FIG. 7 is a schematic illustration of apparatus 220 for electrical discharge machining. Apparatus 220 includes discharge electrode (or EDM tool) 222 for forming cooling hole 106 in wall 100, for example a wall of an airfoil, liner, combustor, nozzle or other component having a second wall surface 104 exposed to hot working fluid flow.

In operation of apparatus 220, a potential difference (or voltage) is applied across electrode 222 and second wall surface 104 of wall 100. When electrode 222 is translated into position to machine wall 100, approaching second wall surface 104 along a machining path, the electric field strength increases and a current or spark discharge occurs, removing material from wall 100 to form cooling hole 106. Material is also removed from electrode 222, requiring machining path compensation as described below.

To produce the particular lobed configuration of cooling hole 106, three dimensional machining paths are defined to generate the desired geometry. One machining path can define metering section 112 of cooling hole 106 along inlet 110 based on the surface profile of wall 100.

Raw machining path data are processed to create machine paths for discharge electrode 222, include X and Y machining (translational) coordinates, and feed rates for motion along the EDM axis. Unlike cutting tools used in conventional machining, however, electrode 222 is continually worn down by the EDM process, and each incremental movement of the machining path must include wear factors to compensate for this effect. Additional variables are generated to determine the axis feed rate, along with the wear factors and other parameters to compensate for wear of electrode 222 during the machining process.

For example, a machining path may be generated to define metering section 112 of cooling hole 106. The length of metering section 112 is defined based on the machining path, and the length is compensated based on electrode wear to determine a machining distance along longitudinal axis 118. Metering section 112 of cooling hole 106 is formed by moving discharge electrode 222 through wall 100 from first wall surface 102 along longitudinal axis 118 the correct machining distance to form metering section 112 adjacent inlet 110. Alternatively, discharge electrode 222 is moved through wall 100 from second wall surface 104 along longitudinal axis 118 to form metering section 112 adjacent inlet 110 and a portion of diffusing section 114.

The particular geometries of outlet 116, first lobe 124 and second lobe 126 are formed in a similar manner. Multiple machining paths are generated to define a lobe pattern in diffusing section 114 of cooling hole 106, where the machining paths define individual shapes (including lengths and angles) for each lobe 124 and 126. Lobes 124 and 126 are then formed by moving discharge electrode 222 through wall 100 for the corresponding machining distance, after compensation for electrode wear to produce the correct machined shape, extending through diffusing section 114 to metering section 112.

Discharge electrode 222 can also be operated in a manner similar to an end mill, where the electrical discharge process is utilized to remove material from wall 100 along either the sides or end of electrode 222. In particular, interlobe region 142 can be formed along end 146 of outlet 116 by generating a transverse machining path defining the width of end 146. The machining distance is compensated for electrode wear, and discharge electrode 222 is translated laterally along outlet 116 by the compensated machining distance, forming interlobe region 142 along a substantially straight or convex end 146.

In general, multiple machining paths are generated depending on the number of lobes 124 and 126 desired in the final configuration of diffusing section 114. For example, machining paths may be generated to define two lobes 124 and 126 divided by a single ridge 152, or three lobes divided by two ridges, as shown in U.S. Provisional Application No. 61/599,381, filed on Feb. 15, 2012 and entitled "TRI-LOBED COOLING HOLE AND METHOD OF MANUFACTURE".

The gas turbine engine components, gas path walls and cooling holes described herein can thus be manufactured using one or more of a variety of different processes. These techniques provide each cooling hole and cooling hole with its own particular configuration and features, including, but not limited to, inlet, metering, transition, diffusion, outlet, upstream wall, downstream wall, lateral wall, longitudinal, lobe and downstream edge features, as described above. In some cases, multiple techniques can be combined to improve overall cooling performance or reproducibility, or to reduce manufacturing costs. For example, the diffusing section can be made by EDM processes and the metering section can be made by processes, such as laser drilling or water jet machining.

Other suitable manufacturing techniques for forming the cooling configurations described here include, but are not limited to, additional EDM processes, laser drilling, laser machining, electrical chemical machining (ECM), water jet machining, casting, conventional machining and combinations thereof. Further, electric discharge machining includes both machining using a shaped electrode 222 as well as multiple pass methods using a hollow spindle electrode 222, or similar electrode component.

Laser machining methods include, but are not limited to, material removal by ablation, trepanning and percussion laser machining. Conventional machining methods include, but are not limited to, milling, drilling and grinding.

The gas flow path walls and outer surfaces of some gas turbine engine components include one or more coatings, such as bond coats, thermal barrier coatings, abrasive coatings, abradable coatings and erosion or erosion-resistant coatings. For components having a coating, the inlet, metering portion, transition, diffusion portion and outlet cooling features may be formed prior to coating application, after a first coating (e.g., a bond coat) is applied, or after a second or third (e.g., interlayer) coating process, or a final coating (e.g., environmental or thermal barrier) coating process.

Depending on component type, cooling hole location, repair requirements and other considerations, the diffusion portion and outlet features may be located within a wall or substrate, within a thermal barrier coating or other coating layer applied to a wall or substrate, or based on combinations thereof. The cooling geometry and other features may remain as described above, regardless of position relative to the wall and coating materials or airfoil materials.

In addition, the order in which cooling features are formed and coatings are applied may affect selection of manufacturing techniques, including techniques used in forming the inlet, metering portion, transition, outlet, diffusion portion and other cooling features. For example, when a thermal barrier coat or other coating is applied to the outer surface of a gas path wall before the cooling hole is produced, laser ablation or laser drilling may be used.

Alternatively, either laser drilling or water jet machining may be used on a surface without a thermal barrier coat. Additionally, different machining methods may be more or less suitable for forming different features of the cooling hole or cooling hole, for example, different EDM, laser machining and other machining techniques may be used for forming the outlet and diffusion features, and for forming the transition, metering and inlet features.

While the invention is described with reference to exemplary embodiments, it will be understood by those skilled in the art that various changes may be made and equivalents may be substituted without departing from the spirit and scope of the invention. In addition, different modifications may be made to adapt the teachings of the invention to particular situations or materials, without departing from the essential scope thereof. The invention is thus not limited to the particular examples disclosed herein, but includes all embodiments falling within the scope of the appended claims.

Discussion of Possible Embodiments

The following are non-exclusive descriptions of possible embodiments of the present invention.

A method for forming a cooling hole extending from an inlet on a first surface of a wall to an outlet on a second surface of the wall can include forming a metering section of the cooling hole, a diffusing section of the cooling hole, and a trailing edge on the outlet by electrical discharge machining, and forming longitudinal lobes in the diffusing section. The metering section can extend from the inlet on a first surface of the wall towards the second surface of the wall. The diffusing section can extend from the outlet to one end of a metering section located between the inlet and the outlet. The outlet can be substantially linear or convex at the trailing edge and the lobes can be separated by longitudinal ridges.

The system of the preceding paragraph can optionally include, additionally and/or alternatively any, one or more of the following features, configurations and/or additional components:

the method can further include generating a machining path defining an axis of the cooling hole with respect to the first surface of the wall;

the method can further include defining a shape of the cooling hole based on the machining path and compensating the shape for electrode wear to determine a machining distance along the axis;

forming the cooling hole can include machining the wall by translating an electrical discharge electrode along the axis by the machining distance, such that the cooling hole extends from the inlet to the outlet;

the method can further include generating multiple machining paths defining a lobe pattern in the diffusing section, each of the multiple machining paths defining a shape of a longitudinal lobe;

forming the lobes can include compensating each of the shapes for electrode wear to determine a machining distance for each lobe, and translating an electrical discharge electrode along each of the lobes by the machining distance, such that each of the lobes extends to the metering section;

the method can further include forming an interlobe region along the trailing edge of the outlet by electrical discharge machining;

the method can further include generating a machining path defining a width of the trailing edge and determining a trailing edge machining distance by compensating the width for electrode wear;

forming the outlet can include translating an electrical discharge electrode laterally along the trailing edge of the outlet by the trailing edge machining distance, such that the interlobe region extends along substantially all of the width of the trailing edge;

forming adjacent lobes in the diffusing section can include forming two adjacent lobes separated by a single longitudinal ridge;

forming adjacent lobes in the diffusing section can include forming three adjacent lobes separated by two longitudinal ridges;

forming the cooling hole through the wall can include machining the cooling hole through a pressure surface or a suction surface of an airfoil;

forming the cooling hole through the wall can include machining the cooling hole through a platform surface of an airfoil;

the method can further include positioning an impingement baffle along the wall; and/or the method can further include forming impingement holes in the impingement baffle, the impingement holes configured to direct jets of cooling fluid flow onto the first surface of the wall.

A method for forming a cooling hole in a wall of a gas turbine engine component can include machining a metering section in the wall by moving a discharge electrode along an axis for a first machining distance, machining lobes along the cooling hole by moving a discharge electrode longitudinally along the wall for a set of second machining distances and machining a trailing edge onto the lobes by moving a discharge electrode transversely along the wall by a third machining distance. The first machining distance can be determined by compensating a shape of the metering section for electrode wear. The second machining distances can be determined by compensating shapes of each lobe for electrode wear. The third machining distance can be determined by compensating a width of the trailing edge for electrode wear.

The system of the preceding paragraph can optionally include, additionally and/or alternatively any, one or more of the following features, configurations and/or additional components:

machining lobes along the cooling hole can include forming longitudinal ridges between adjacent lobes;

machining lobes along the cooling hole can include forming two longitudinal ridges between three adjacent lobes;

machining a trailing edge onto the lobes can include machining an interlobe region along the trailing edge; and/or the method can further include positioning an impingement baffle adjacent the wall, the impingement baffle comprising impingement holes configured to direct jets of cooling fluid flow onto the wall.

The invention claimed is:

1. A method for forming a cooling hole extending from an inlet on a first surface of a wall to an outlet on a second surface of the wall, the method comprising:

forming a metering section of the cooling hole, the metering section extending from the inlet on the first surface of the wall towards the second surface of the wall;

forming a diffusing section of the cooling hole by electrical discharge machining, the diffusing section extending from the outlet to one end of the metering section located between the inlet and the outlet, wherein forming the diffusing section comprises:

forming a first lobe that diverges longitudinally and laterally from the metering section and has a trailing edge;

forming a second lobe that diverges longitudinally and laterally from the metering section and has a trailing edge; and forming one of (1) a transition region having a portion that extends between the first and second lobes and a downstream end adjacent the outlet so that the downstream end is at least axially coextensive with the trailing edges of the first and second lobes and (2) a third lobe that diverges longitudinally and laterally from the metering section and has a trailing edge;

forming a trailing edge on the outlet by electrical discharge machining, wherein the outlet is substantially linear or convex at the trailing edge.

2. The method of claim 1, wherein forming the lobes in the diffusing section comprises forming two adjacent lobes separated by a single longitudinal ridge.

3. The method of claim 1, wherein forming the lobes in the diffusing section comprises forming three adjacent lobes separated by two longitudinal ridges.

4. The method of claim 1, wherein forming the cooling hole through the wall comprises machining the cooling hole through a pressure surface or a suction surface of an airfoil.

5. The method of claim 1, wherein forming the cooling hole through the wall comprises machining the cooling hole through a platform surface of an airfoil.

6. The method of claim 1, wherein the metering section is formed by electrical discharge machining.

7. The method of claim 1, further comprising generating multiple machining paths defining a lobe pattern in the diffusing section, each of the multiple machining paths defining a shape of a lobe.

8. The method of claim 7, wherein forming the lobes comprises compensating each of the shapes for electrode wear to determine a machining distance for each lobe, and translating an electrical discharge electrode along each of the lobes by the machining distance, such that each of the lobes extends to the metering section.

9. The method of claim 1, further comprising positioning an impingement baffle along the wall.

10. The method of claim 9, further comprising forming impingement holes in the impingement baffle, the impingement holes configured to direct jets of cooling fluid flow onto the first surface of the wall.

11. The method of claim 1, further comprising generating a machining path defining an axis of the cooling hole with respect to the first surface of the wall.

12. The method of claim 11, further comprising defining a shape of the cooling hole based on the machining path and compensating the shape for electrode wear to determine a machining distance along the axis.

13. The method of claim 12, wherein forming the cooling hole comprises machining the wall by translating an electrical discharge electrode along the axis by the machining distance, such that the cooling hole extends from the inlet to the outlet.

14. The method of claim 1, further comprising forming an interlobe region along the trailing edge of the outlet by electrical discharge machining.

15. The method of claim 14, further comprising generating a machining path defining a width of the trailing edges and determining trailing edge machining distances by compensating the width for electrode wear.

16. The method of claim 15, wherein forming the outlet comprises translating an electrical discharge electrode laterally along the trailing edge of the outlet by the trailing edge machining distance, such that the interlobe region extends along substantially all of the width of the trailing edge.

17. A method for forming a cooling hole in a wall of a gas turbine engine component, the method comprising:
 forming a metering section in the wall;
 machining a diffusing section in the wall, wherein machining the diffusing section comprises:
  machining a first lobe that diverges longitudinally and laterally from the metering section and has a trailing edge by moving a discharge electrode longitudinally along the wall for a first machining distance, wherein the first machining distance is determined by compensating a shape of the first lobe for electrode wear;
  machining a second lobe that diverges longitudinally and laterally from the metering section and has a trailing edge by moving a discharge electrode longitudinally along the wall for a second machining distance, wherein the second machining distance is determined by compensating a shape of the second lobe for electrode wear;
  machining one of (1) a transition region having a portion that extends between the first and second lobes and a downstream end adjacent an outlet so that the downstream end is at least axially coextensive with the trailing edges of the first and second lobes and (2) a third lobe that diverges longitudinally and laterally from the metering section and has a trailing edge by moving a discharge electrode along the wall for a third machining distance, wherein the third machining distance is determined by compensating a shape of the transition region or third lobe for electrode wear.

18. The method of claim 17, wherein the metering section in the wall is formed by machining and comprises moving a discharge electrode along an axis for a fourth machining distance, wherein the fourth machining distance is determined by compensating a shape of the metering section for electrode wear.

19. The method of claim 17, wherein machining the lobes comprises machining an interlobe region along the trailing edges of the lobes.

20. The method of claim 17, further comprising positioning an impingement baffle adjacent the wall, the impingement baffle comprising impingement holes configured to direct jets of cooling fluid flow onto the wall.

21. The method of claim 17, wherein machining the lobes comprises forming longitudinal ridges between adjacent lobes.

22. The method of claim 21, wherein machining the lobes comprises forming two longitudinal ridges between three adjacent lobes.

* * * * *